United States Patent
Tse et al.

(10) Patent No.: US 9,529,884 B2
(45) Date of Patent: Dec. 27, 2016

(54) USAGE BASED SYNCHRONIZATION OF NOTE-TAKING APPLICATION FEATURES

(75) Inventors: David Christopher Tse, Kirkland, WA (US); Sattawat Suppalertporn, Redmond, WA (US); Suresh Sitaula, Bellevue, WA (US); Gary Neitzke, Duvall, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 292 days.

(21) Appl. No.: 13/353,331

(22) Filed: Jan. 19, 2012

(65) Prior Publication Data

US 2013/0191335 A1  Jul. 25, 2013

(51) Int. Cl.
G06F 7/00 (2006.01)
G06F 17/00 (2006.01)
G06F 17/30 (2006.01)

(52) U.S. Cl.
CPC .............................. *G06F 17/30578* (2013.01)

(58) Field of Classification Search
CPC ............. G06F 17/30578; G06F 9/544; G06F 17/30557; G06F 17/2288; G06F 9/526
USPC ............. 707/610, 611, 612, 614, 624, 634, 620, 707/623
See application file for complete search history.

(56) References Cited

U.S. PATENT DOCUMENTS

| | | |
|---|---|---|
| 7,707,518 B2 | 4/2010 | Veselova |
| 7,885,925 B1 | 2/2011 | Strong et al. |
| 2002/0087632 A1 * | 7/2002 | Keskar ............ H04L 67/306 709/204 |
| 2002/0163548 A1 | 11/2002 | Chiu et al. |
| 2002/0194177 A1 | 12/2002 | Sherman et al. |
| 2003/0191793 A1 * | 10/2003 | Dolin, Jr. ......... G05B 19/41865 718/103 |
| 2004/0109436 A1 * | 6/2004 | Vargas ............. H04L 29/06 370/350 |
| 2005/0147130 A1 * | 7/2005 | Hurwitz ........... G06F 17/30578 370/503 |
| 2005/0234943 A1 | 10/2005 | Clarke |
| 2006/0075347 A1 | 4/2006 | Rehm |
| 2007/0204280 A1 | 8/2007 | Mukundan et al. |
| 2007/0255785 A1 * | 11/2007 | Hayashi et al. ............. 709/204 |
| 2008/0155525 A1 | 6/2008 | Ho |

(Continued)

FOREIGN PATENT DOCUMENTS

CN  1692434 A  11/2005

OTHER PUBLICATIONS

"Office Web Apps overview (Installed on SharePoint 2010 Products)", Retrieved at <<http://technet.microsoft.com/en-us/library/ff431685.aspx>>, Retrieved Date: Jan. 18, 2012, pp. 7.

(Continued)

*Primary Examiner* — Md I Uddin
(74) *Attorney, Agent, or Firm* — Monica Adjemian; Tom Wong; Micky Minhas (57) ABSTRACT

Methods are disclosed for, within a note-taking application, selectively synchronizing different notebook components with a centralized server. In one particular embodiment, different notebook components are assigned different synchronization rates based on usage characteristics. The different notebook components are synchronized more or less frequently relative to each other based on the assigned synchronization rates.

19 Claims, 8 Drawing Sheets

(56) References Cited

U.S. PATENT DOCUMENTS

| | | |
|---|---|---|
| 2009/0157811 A1 | 6/2009 | Bailor et al. |
| 2010/0191807 A1 | 7/2010 | Brown et al. |
| 2010/0228699 A1* | 9/2010 | Webber et al. ............... 707/622 |
| 2010/0281484 A1 | 11/2010 | Myhre |
| 2010/0318559 A1* | 12/2010 | Yan et al. .................... 707/769 |
| 2011/0093434 A1* | 4/2011 | Arora et al. .................. 707/622 |
| 2011/0185202 A1 | 7/2011 | Black et al. |
| 2011/0307788 A1 | 12/2011 | Cheung et al. |
| 2012/0079223 A1* | 3/2012 | Jaquette .................. G06F 12/00 711/162 |
| 2012/0117271 A1* | 5/2012 | Kennedy ........... G06F 17/30575 709/248 |
| 2012/0209892 A1* | 8/2012 | MacAskill et al. ........... 707/812 |
| 2012/0239886 A1* | 9/2012 | Rantanen .......... G06F 17/30578 711/147 |

OTHER PUBLICATIONS

Perez, Sarah, "OneNote 2010 will Sync to Mobile and Cloud", Retrieved at <<http://channel9.msdn.com/blogs/coolstuff/onenote-2010-will-sync-to-mobile-and-cloud>>, Retrieved Date: Nov. 10, 2010, pp. 2.

"Share notes by using a SharePoint site", Retrieved at <<http://office.microsoft.com/en-us/onenote-help/share-notes-by-using-a-sharepoint-site-HA010131477.aspx>>, Retrieved Date: Jan. 18, 2012, pp. 2.

"NoteShare", Retrieved at <<http://itunes.apple.com/us/app/noteshare/id428850465?mt=12>>, Retrieved Date: Jan. 18, 2012, pp. 3.

"International Search Report", Mailed Date: Apr. 30, 2013, Application No. PCT/US2013/021505, Filed date: Jan. 15, 2013, pp. 9.

"Supplementary European Search Report for European Patent Application No. 13738001.0", Mailed Date: Sep. 16, 2015, 7 Pages.

"First Office Action and Search Report Issued in Chinese Patent Application No. 201380006195.4", Mailed Date: Feb. 1, 2016, 15 Pages.

Second Office Action and Search Report Issued in Chinese Patent Application No. 201380006195.4, Mailed Date: Oct. 8, 2016, 11 Pages.

* cited by examiner

USAGE BASED SYNCHRONIZATION OF NOTE-TAKING APPLICATION FEATURES

BACKGROUND

Content for a note-taking application can be stored on a centralized database server that is made remotely accessible to a plurality of client computing devices upon which the note-taking application is run. In addition, a record of adjustments to application configuration variables and settings may be similarly centrally stored, perhaps but not necessarily on the same centralized database server as the content. This application architecture is beneficial at least in that it enables some degree of device independence. For example, the architecture enables a given user of the note-taking application to enjoy a relatively consistent user experience from any of a variety of different computing devices utilized to operate the note-taking application (mobile phones, tablets, laptops, PC's, etc). The architecture also enables groups of users to enjoy access to a shared collection of notes available both on and offline.

There are, however, technical challenges associated with the described architecture. For example, its effectiveness is dependent upon relatively frequent data synchronization between the centralized database(s) and the devices utilized to operate the note-taking application. This translates into a relatively high consumption of network bandwidth and a large demand for server and client device resources, which can lead to negative application performance consequences. Also or alternatively, it may lead to an undesirably increased need for additional or enhanced system processing, data storage, or battery life resources.

SUMMARY

Certain embodiments of the present invention pertain to, within a note-taking application, selectively synchronizing different notebook components with a centralized server. In one particular embodiment, different notebook components are assigned different synchronization rates based on usage characteristics. The different notebook components are synchronized more or less frequently relative to each other based on the assigned synchronization rates.

DETAILED DESCRIPTION OF ILLUSTRATIVE EMBODIMENTS

Figure 1:
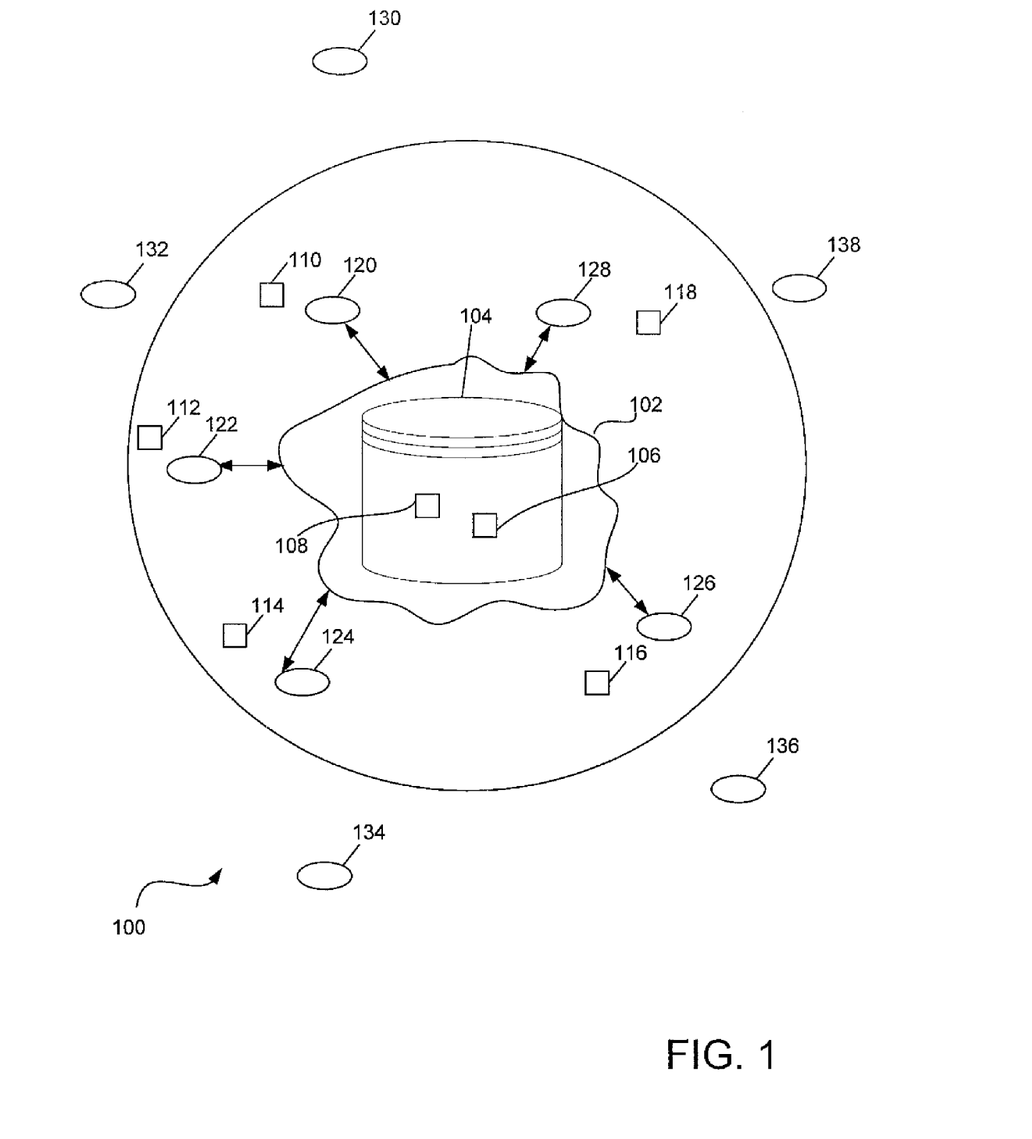
FIG. 1 is a schematic diagram of a note-taking application architecture.

FIG. 1 is a simplified schematic diagram of exemplary note-taking application architecture 100. A plurality of application users 110, 112, 114, 116 and 118 operate a plurality of corresponding computing devices 120, 122, 124, 126 and 128, respectively. These users each also have an alternate computing device available to them. The alternate devices are labeled 130, 132, 134, 136 and 138 (which correspond to users 110-118, respectively).

Each user illustratively operates a note-taking application by way of interactions with their device and/or alternate device. The devices and alternate devices shown in FIG. 1 may be any of a wide variety of computing devices including, but not limited to, laptop computers, personal digital assistants, mobile phones, pad computers, personal computers, e-reader devices, multi-touch input/output panels, etc. Of course, users 110-118 may have more or less devices for operating the note-taking application.

When the users 110-118 utilize one of their computing devices to interact with the note-taking application, part of this interaction illustratively involves storage and retrieval of application content relative to a "cloud-based" database server 104. The database symbol utilized to represent server 104 is intended to represent all server components, including the database components themselves. Database server 104 is shown in FIG. 1 within a cloud 102. Those skilled in the art will appreciate that this signifies that server 104 is stored on a network server remotely accessed by any or all of devices 120-138 in accordance with user-initiated commands.

The precise details of the network implementation of the note-taking application are not necessarily critical to the present invention. In one embodiment, the note-taking application includes application components that run at least partially from the devices 120-138. However, it is also within the scope of the present invention for the application to be partially, primarily or completely operable from a network location, for example, from within cloud 102. In this case, any or all of devices 120-138 may include a separate application such as a network browser application for facilitating interaction with the note-taking application. Any combination of remote or client-based distribution of functions or components of the note-taking application should be considered within the scope of the present invention.

Regardless of the particular distribution of the note-taking application functionality, it is consistent with one embodiment of the present invention for a collection of content data 106 to be stored within database 104, which is made accessible by way of network architecture 102 (e.g., the Internet or "the cloud"). The note-taking application is illustratively a free-form information gathering and multi-user collaboration platform that enables the users 110-118 to store notes, drawings, screen clippings, audio, video and any other item of content as part of content 106. Access to the content is selectively shared among the users based on certain preferences and system settings. When one or more of users 110-118 desire to share all or parts of their own content 106 with other of the users, functions are included within the note-taking application to enable them to adjust system parameters to share or not share with others as they see fit. Other sharing policies may be imposed, for example, based on security restrictions or other system-imposed requirements, etc.

In one embodiment, the note-taking application differs from a traditional word processing application at least in that it supports more flexible user collaboration and is more free-form in terms of how and where the user is allowed to submit content into by way of the application user interfaces. Further, in one embodiment, users of the note-taking application generally are not required to issue a save order or command because the note-taking application automatically saves the data, for example as it is entered. Still further, in one embodiment, the note-taking application is configured to conveniently assist in the user-initiated organization of content into what is essentially an electronic manifestation of a notebook-style (e.g., tabbed) organization system. Users of the application are provided with functions that enable them to selectively tab, re-tab, re-organize, add content to, subtract content from, and otherwise manipulate content stored within electronic notebooks and the various tabbed components thereof.

In one embodiment, the note-taking application supports off-line, user-driven editing and then later synchronization of the edits with database 104. In another embodiment, the application allows collaboration in that more than one person can work on "the same notebook page" or within "the same notebook" at the same time. These are but examples of features of an illustrative note-taking application. The scope of the present invention is not limited to a system that includes an exact combination or configuration of features as described herein. Other combinations and configurations of features should also be considered within the scope. For example, while the architecture shown in FIG. 1 shows only one database 104, those skilled in the art will appreciate that there might actually be many databases distributed in what might even be a relatively complex data storage and distribution scheme.

As is reflected in FIG. 1, it is common for users of a note-taking application to interact with the application utilizing more than one computing device. As the popularity of mobile devices continues to increase, it is likely to become even more common for users to access and utilize such an application from any or all of their available mobile, client, browser and other device interfaces. It is therefore desirable for the note-taking application to support a user experience that is as consistent as possible from one device to the next. In other words, it is probably not a good strategy to assume that users 110-118 are likely to always or even most often use a single device (e.g., a single PC or a single mobile device) when interacting with the application. This being the case, an ideal application design will enable users 110-118 to manage data in storage area 106 in a consistent manner from one use session to the next regardless of whether they are interacting from their primary computing devices 120-128, their alternate computing devices 130-138, or some other computing device.

A logical place to start in terms of maintaining a consistent user experience across multiple devices is to configure the application system to provide users with access to content in a generally device independent manner. For example, if user 110 utilizes device 120 to make a change to the content of a note, the user will ideally see that change made when he or she later accesses the same note utilizing device 130. Or, if user 116 utilizes device 126 to make a change to the content of a note to which user 120 has access, user 120 will ideally see that change regardless of which device he or she uses to retrieve the note. It is not ideal for a user to be forced to deal with the potential inconveniences of device dependence when it comes to content changes and additions.

As has been alluded to, some or all of the content of the note-taking application is illustratively maintained in a centrally accessible storage location such that additions, changes and deletions pertinent to the centrally stored content data are made available to users in a generally device independent manner. For example, by storing a latest version of application content in database 106, it becomes possible to provide that version of the content to essentially any device. In essence, modifications or additions to content are made to roam so as to be apparent regardless of being accessed from one particular device or another. All of this assumes, of course, enforcement of content access restrictions as appropriate in light of applicable application access policies, if any (e.g., user-initiated and/or automatically applied content sharing restrictions, etc.).

Content changes and additions are not the only aspects of the note-taking application that may be configured to roam in a device independent manner as described. Device-to-device application consistency is illustratively also supported for application configuration variables and settings, such as but not necessarily limited to user-selected application configuration variables and settings. For example, if user 110 utilizes device 120 to cause a change to an application configuration variable or setting, the user will ideally again see the impact of that change when he or she later interacts similar with the application utilizing device 130. Or, if user 116 utilizes device 126 to cause a change to an application configuration variable or setting in a manner that affects the application experience of user 120, user 120 ideally will see the impact of that change regardless of which device is used to interact with the application. This roaming of application configuration variables and settings furthers the goal of supporting access source flexibility while minimizing the negative impact of such flexibility on the consistency of the user experience.

There are, however, technical challenges associated with the described device independent approach. For example, its effectiveness is dependent upon a relatively frequent data sync between the centralized database(s) and the devices utilized to operate the note-taking application. This translates into a relatively high consumption of network bandwidth and a large demand for server and client device resources, which can lead to negative application performance consequences and/or an undesirably increased need for investment in additional system resources.

In accordance with one aspect of the present invention, instances of the note-taking application client (e.g., operating on any or all of devices 120-138) are configured to periodically synchronize content, as well as configuration variables and settings, with a centralized server(s) (e.g., with a server system that includes database 104). An application module illustratively monitors usage of specific components of the note-taking application (e.g., but not by limitation, specific notebooks and/or notebook pages). This monitoring module is illustratively, but not by limitation, a software module that is part of the note-taking application and operates as part of the client portion of the application infrastructure. Thus, the monitoring illustratively occurs on a client-by-client basis.

In accordance with another aspect of the present invention, the module also includes instructions for selecting and assigning a synchronization rate for each of the monitored application components. This assignment is illustratively made as a function of the result of the monitoring of usage patterns. For example, the monitored application components determined to be used more frequently will illustratively be assigned a more frequent synchronization rate. Conversely, the monitored application components determined to be used less frequently will illustratively be assigned a less frequent synchronization rate.

An example will help illustrate how the system logically links the pattern of usage of a notebook component to an appropriate synchronization rate. One can imagine a scenario in which the monitoring process leads to a determination that a user of the note-taking application originally opened a particular notebook on their client one year ago but has now not opened that notebook in the last six months. Embodiments of the present invention pertain to an implementation of software functionality that causes the client or clients to synchronize this forgotten particular notebook less frequently than notebooks determined to be utilized more actively. This enables a more efficient use of network bandwidth and of the server and database resources hosting the note-taking application.

Figure 2:
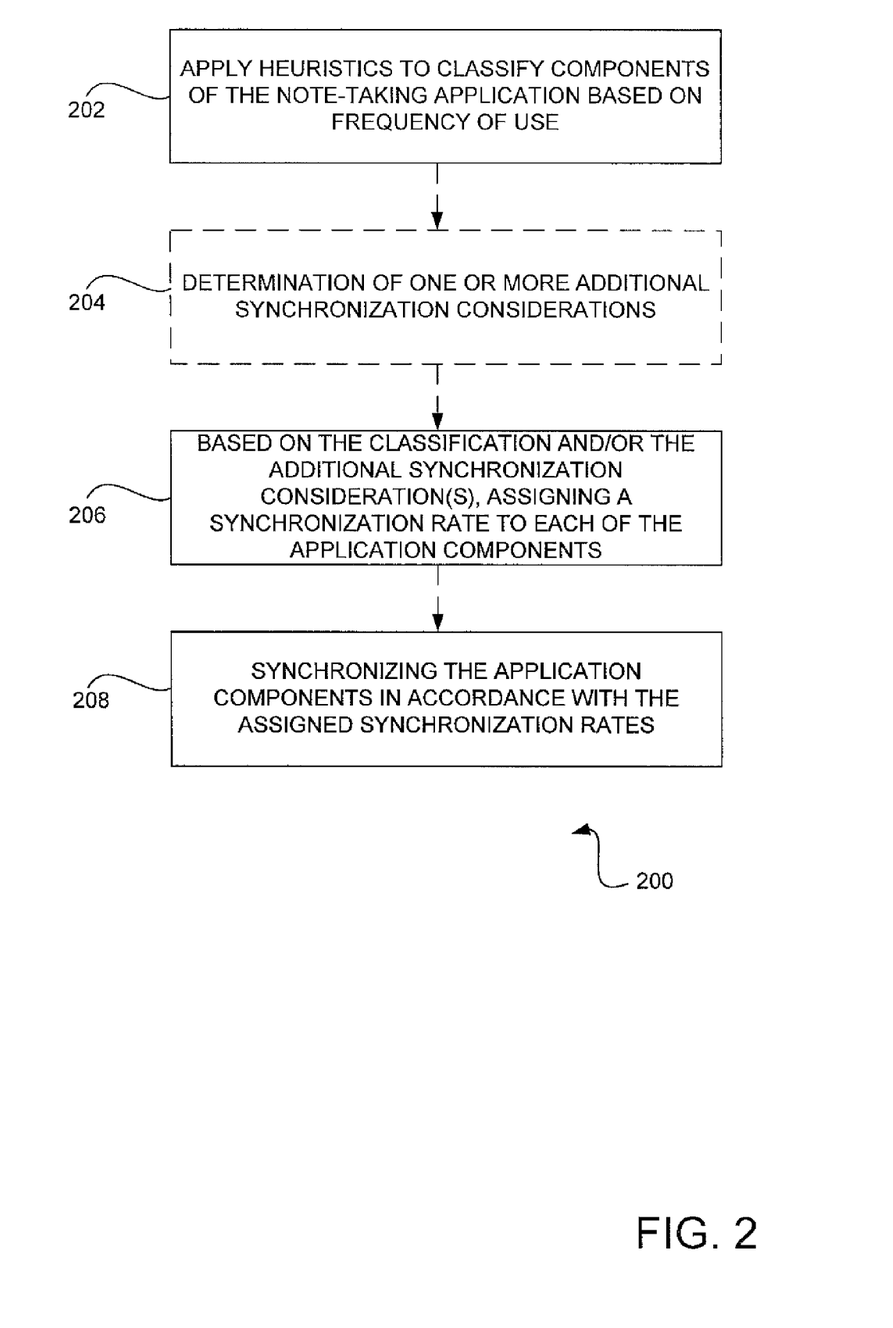
FIG. 2 is a block flow diagram of a synchronization method.

With all of this in mind, FIG. 2 is a block flow diagram demonstrating a method 200 for selectively implementing client synchronization operations in the context of a note-taking application operated in a client-server application environment. In accordance with block 202, a set of heuristics is applied to classify components of the note-taking application based on frequency of use. This classification illustratively reflects an overall goal to logically infer which components the user of the application cares more/less about.

Figure 3:
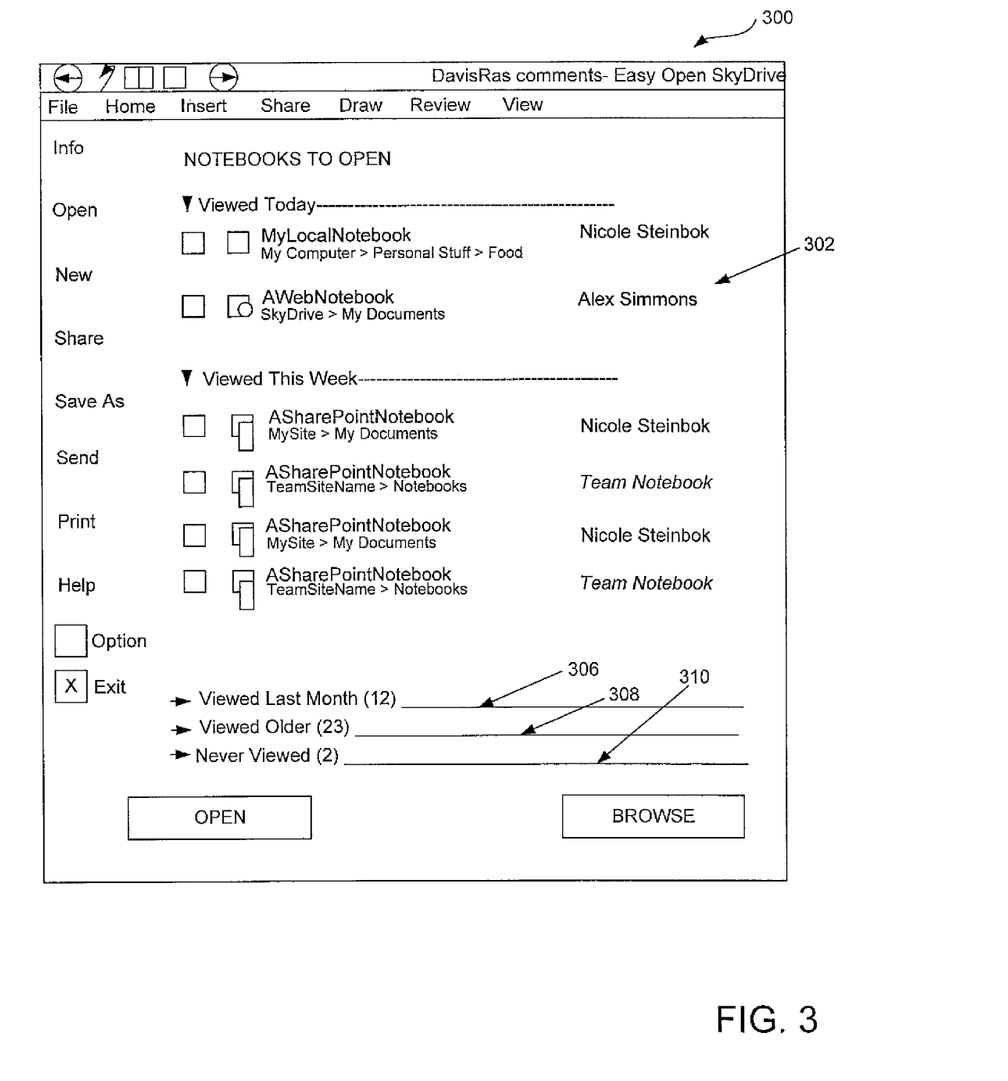
FIG. 3 is an example screen shot within an example note-taking application.

FIG. 3 is an example screenshot 300 of one embodiment of the note-taking application. Screenshot 300 shows notebooks distributed into five different categories 302-310 based on when the current user of the application viewed each notebook. Categories 302, 304, 306, 308 and 310 correspond to viewed today, viewed this week, viewed last month, viewed more than a month ago and never viewed, respectively. In one embodiment, the set of heuristics applied in accordance with step 202 classifies notebooks and/or notebook components into the same or similar categories. However, those skilled in the art will appreciate that the particular classification scheme may vary from one application or implementation to the next depending upon developer and/or user preferences.

Step 204 in method 200, which is illustratively an optional step, indicates a determination of one ore more synchronization characteristics. As will become evident, method 200 involves a selective synchronization process based on the classification determined by the heuristics applied in accordance with step 202. The purpose of box 204 is to indicate that the process may just as easily be configured to take into account one or more additional variables other than the classifications determined in accordance with step 202. For example, the selective synchronization processes described herein can, in one embodiment, be further configured to take network connectivity characteristics into account when setting the frequency at which a given application component will be synchronized. A more detailed embodiment along these lines will be showed and described in relation to FIG. 3.

In accordance with block 206 of method 200, a synchronization rate is assigned to each of the application components based on the classification of step 202 and/or the additional synchronization considerations of step 204. The synchronization rates illustratively assigns a period of time or frequency at which the client will select the application component for synchronization with the database server. Finally, step 208 represents the actual synchronizing of the application components in accordance with the assigned synchronization rates.

Figure 4:
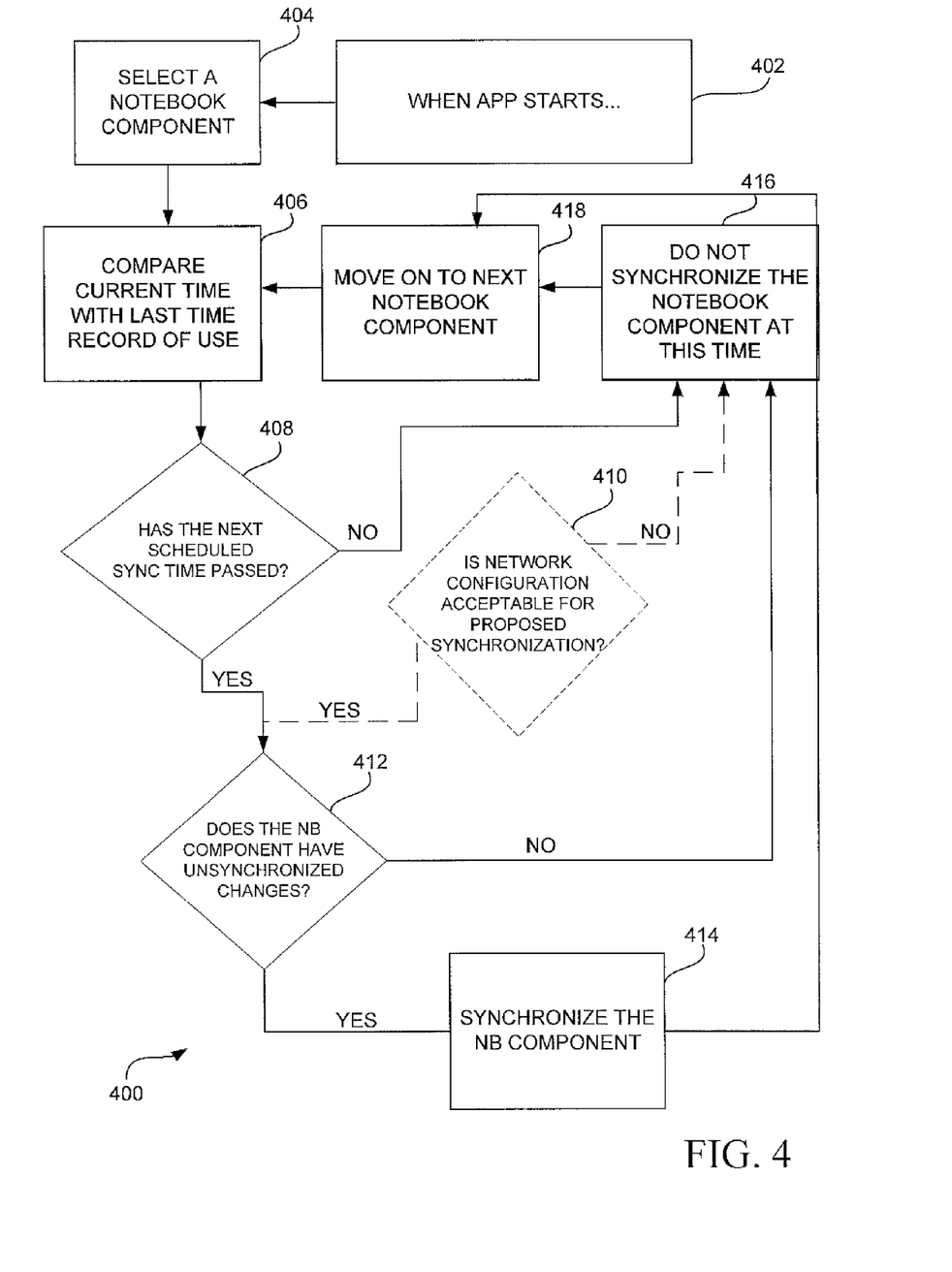
FIG. 4 is a block flow diagram of another synchronization process.

FIG. 4 is a block flow diagram demonstrating, in accordance with another embodiment of the present invention, a more detailed methodology 400 for managing the synchronization process from the perspective of a client-side of the client-server implemented note-taking application. Within the Figure, the acronym "NB" is intended to operate as shorthand for "notebook." Block 402 simply represents a moment when the note-taking is first initiated or started. Those skilled in the art will appreciate that this could represent a variety of different events including, but not limited to, an initial loading of the application, a transfer of the application from an offline mode to an online mode, a determination that a connection to the centralized database server has become established, a powering on of a client device upon which the note-taking application operates, a user-initiated forced synchronization request (e.g., user commands sync to be carried out regardless of when next sync is scheduled to occur automatically), etc. Really, block 402 more broadly represents any event that triggers the synchronization process. In one embodiment, the system is configured to "wake up" and perform a synchronization upon a determination that the user is not "idle" on the system any more (e.g., a mouse move after a period of inactivity/ screensaver exit/screen unlock/etc.).

Block 404 represents selection of a notebook component. The precise nature of the notebook component will depend upon the notebook concept around which a given implementation focuses the synchronization process. For example, synchronization can be configured to operate on a page-by-page (i.e., notebook pages) basis, a notebook-by-notebook basis, or on the basis of any other notebook-oriented conceptualization without departing from the scope of the present invention. Another example within the scope is a group of notebooks that are collectively considered as a single unit for the purpose of the synchronization scheme.

In accordance with block 406, for the selected notebook component, the current time is compared to the time of the most recent user access of that component. Then, in accordance with decision block 408, a determination is made based on the comparison as to whether the next schedule synchronization time has passed. In one embodiment, not by limitation, that determination is made in accordance with software logic implemented so as to be consistent with the information in the following table:

| Category | Requirement | Sync. Rate |
| --- | --- | --- |
| Regular Notebook | Viewed in last 9 days | 30 Minutes |
| Moderate Interest Notebooks | Viewed in last 9-21 days | 2 Hours |
| Low Interest Notebooks | Viewed in last 21+ days | 24 Hours |

The first column in this table represents three different categories of notebook components (note: this cold mean any notebook component as discussed above but will be referred to simply as "notebook" for illustrative purposes). The second column then represents the criteria applied in order to determine which of the three categories a particular notebook falls into. Finally, the third column represents a setting of different synchronization rates in relation to the notebooks in each of the three different categories.

Accordingly, the comparison of step 406 enables a determination of which one of the criteria in second column applies. The determinative factor is when the notebook was last viewed. So, a given notebook component can only be included in one of the three categories (e.g., a notebook last viewed 14 days ago will be included only in the second category). The synchronization rate applicable to a given notebook component is contingent upon when the notebook component was last viewed. Those skilled in the art will appreciate that the table above is only one way to configure the assignment of synchronization rates. The actual number of categories and the strategy reflected in the various qualifying criteria and synchronization rates are likely to vary from one implementation to the next.

With all of this in mind, the determination made in association with block 408 is illustratively a determination as to whether the notebook component selected in accordance with block 404 requires synchronization in light of the assigned synchronization rate. In one embodiment, this means the rate assigned in accordance with the logic reflected in a synchronization table such as the example provided above. If enough time has not passed to warrant synchronization in accordance with the assigned synchronization rate, then the process passes to block 416, which represents a decision not to currently synchronize the notebook component. Then, in accordance with block 418, the process is then repeated for a different notebook component.

If the determination of block 408 is that enough time has passed to warrant synchronization, the process illustratively passes to another determination represented by block 412. However, it is worth mentioning at this point that it is within the scope of the present invention for the decision to synchronize a given notebook component or not can be made contingent upon any number of variables. Block 410 represents another variable that may be included in the decision making process. In accordance with block 410, which is shown in dots in order to emphasize that it is an optional step in the process, a determination is made as to whether or not the current network configuration is acceptable for proceeding with the synchronization process. In one embodiment, this means extending the software logic such that the synchronization table described above is extended as follows:

| Category | Requirement | Sync. Rate | Low Bandwidth? |
|---|---|---|---|
| Regular Notebook (NB) | Viewed in last 9 days | 30 Minutes | Yes |
| Moderate Interest NB | Viewed in last 9-21 days | 2 Hours | No |
| Low Interest NB | Viewed in last 21+ days | 24 Hours | No |

In this case, the logic reflects a desire to further limit synchronization in instances where the options for remotely communicating the synchronization operations are limited to only a low bandwidth communication path (e.g., 3G is a low bandwidth alternative compared to Wifi, Ethernet, 4G, etc.). Regardless of a determination in accordance with block 408 that it is time to synchronize the notebook component, the synchronization process will be cancelled or at least postponed if the notebook component is of low or moderate interest and the only network availability is a low bandwidth communication alternative. Block 410 represents going to block 416, 418 and back to block 406 when the "no" outcome applies in accordance with the fourth column of the chart. If there is a sufficient network communication option, the process proceeds to block 412. Those skilled in the art will appreciate that this four column table is also only representative of a single possibility in terms of configuring the desirable outcomes. The actual number of categories and the strategy reflected in the various qualifying criteria, synchronization rates, and bandwidth requirements are likely to vary from one implementation to the next.

In one embodiment, when it is determined that synchronization is warranted other than the fact that there is not an appropriate network configuration, the system is configured to simply postpone synchronizing until the network configuration is updated to a value appropriate for synchronization. In other words, when the network configuration is updated, the postponed synchronization operations are automatically carried out. Of course, it is also within the scope of the present invention for similar postponement logic to be implemented in relation to other variables upon which synchronization determinations are made.

Block 412 represents a determination as to whether or not the notebook component includes changes in need of synchronization. If no changes have been made to the component, then there is nothing to synchronize and the process can simply proceed to blocks 416 and 418. However, if there are changes in need of synchronization, then the process proceeds to block 414 and the synchronization of the notebook component is carried out.

Following synchronization, the process, consistent with block 418, is essentially repeated for a different notebook component. In one embodiment, regardless of whether the outcome is synchronization or no synchronization, the process is repeated again and again until there are no more notebook components to check for synchronization purposes. Of course, notebook components that are not synchronized in accordance with block 416 can be later cycled back through the process to determine whether circumstances have changed so as to warrant synchronization.

When a user views a moderate or low interest notebook component, the system is illustratively configured to automatically update that component's view time so as to make it a regular notebook component. In one embodiment, this programmatically triggers synchronization of the component if it is more than 30 minutes out of data. Of course, any other applicable synchronization restrictions must also be satisfied before synchronization occurs. For example, if there is an applicable network restriction, it illustratively must also be satisfied.

In one embodiment, any variable included in the synchronization scheme can be adjusted by a system administrator and/or by the client user of the note-taking application. For example, a user can illustratively selectively set the synchronization intervals and/or the network configuration requirements. In another embodiment, any of the synchronization settings can be automatically adjusted, for example, by programmatic logic implemented on the client or server side of the application architecture. In one embodiment, the server is illustratively configured to selectively adjust the client synchronization parameters based on any criteria such as but not limited to the current server load, etc.

FIGS. 5-8 show a number of different embodiments for computing devices upon which embodiments of the present invention may be implemented. While these embodiments will be described in FIGS. 5-8, it should be noted that these are not exclusive, but are provided as illustrative and exemplary descriptions of embodiments of devices applicable to embodiments of the present invention.

While systems (e.g., software applications) that implement a note-taking application consistent with embodiments described herein can primarily reside on a client device such as those specifically shown herein, such systems could just as easily be embodied elsewhere, such as in a cloud computing environment, possibly but not necessarily in conjunction with the same environment within which application configuration variables and settings are centrally stored. Cloud computing provides computation, software, data access, and storage services that generally do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the functions described herein can be provided from a service provider at a remote location using a cloud computing architecture. Alternatively, they can be provided from a conventional server, or they can be installed on a client device directly.

Figure 5:
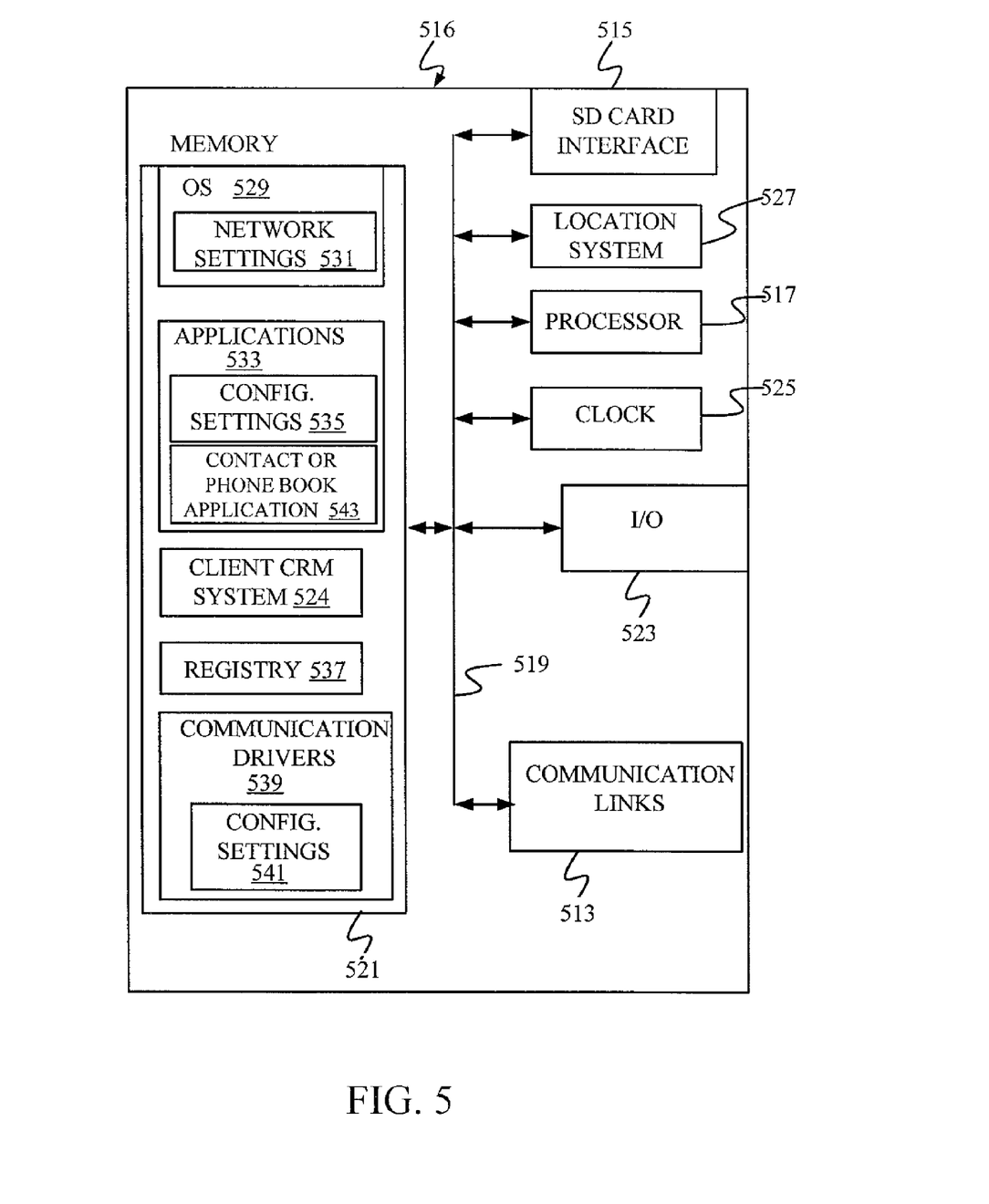
FIG. 5 is a simplified block diagram of a mobile computing device.
Figure 6:
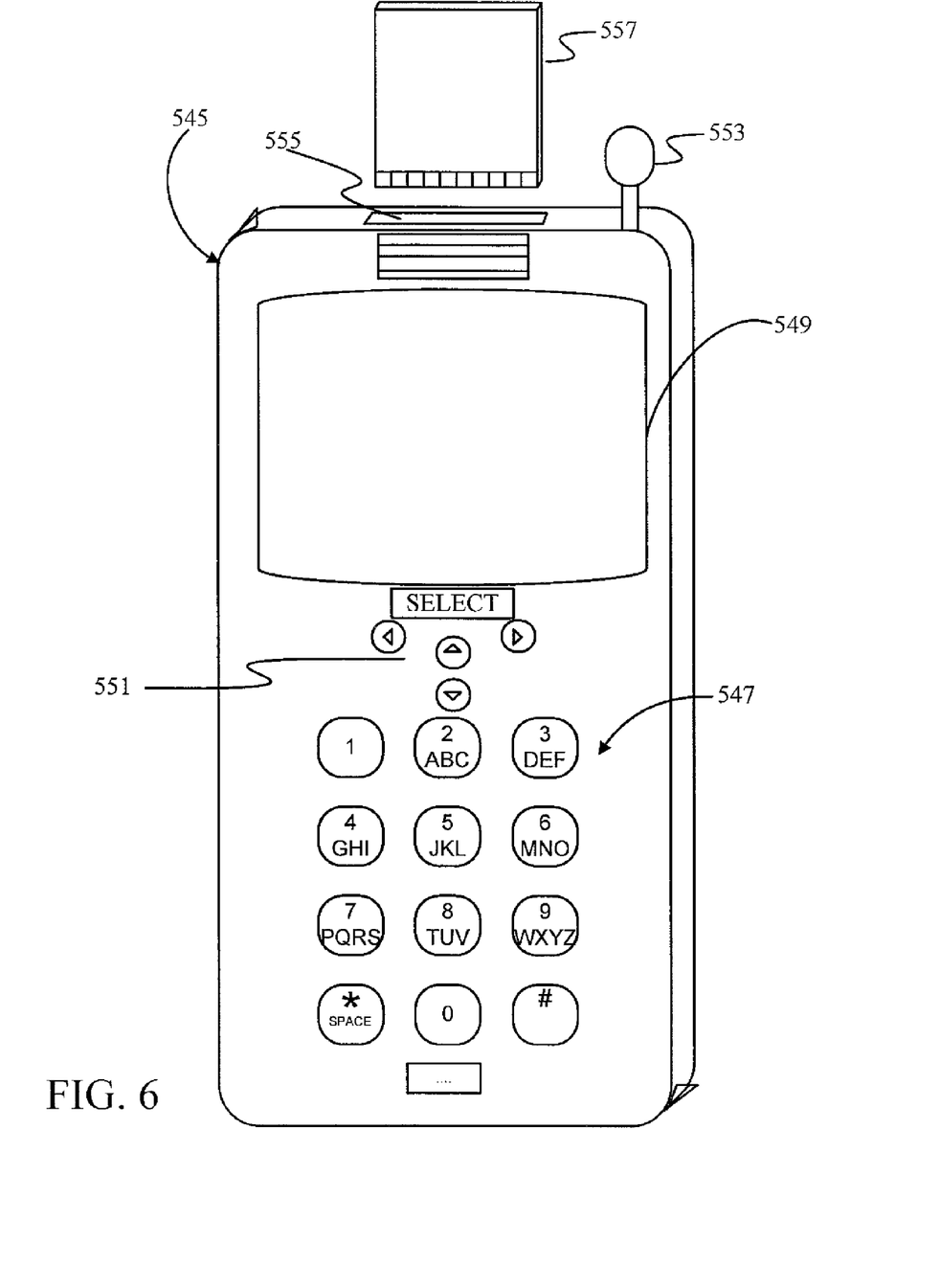
FIG. 6 is a schematic diagram of an example of a smart phone or mobile phone.
Figure 7:
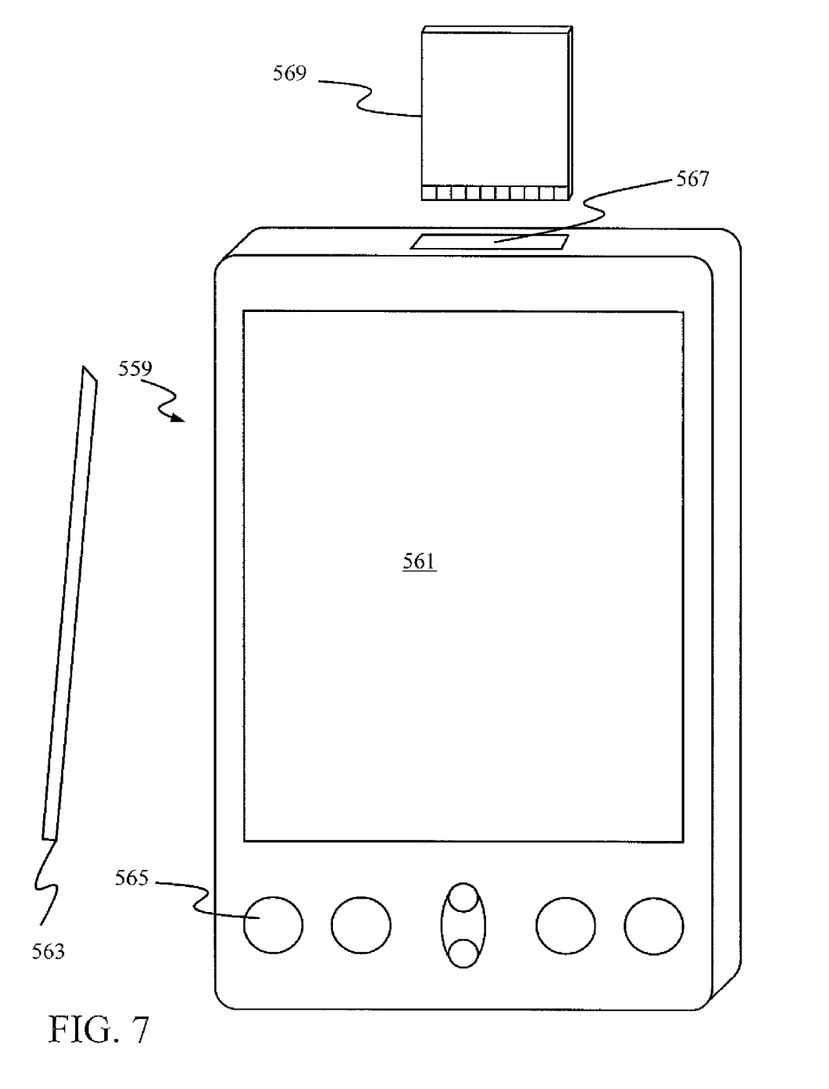
FIG. 7 is a schematic diagram of a personal digital assistant (PDA) or a multimedia player or a slate or tablet computing device.

In any case, FIG. 5 is a simplified block diagram of one illustrative embodiment of a handheld or mobile computing device that can be used as a client device, upon which systems that implement embodiments of the present invention may be deployed. FIGS. 6 and 7 are examples of handheld or mobile devices.

FIG. 5 provides a general block diagram of the components of a client device. In the device, a communications link 513 is provided that allows the handheld device to communicate with other computing devices and under some embodiments provides a channel for receiving information automatically, such as by scanning. Examples of communications link 513 include an infrared port, a serial/USB port, a cable network port such as an Ethernet port, and a wireless network port allowing communication though one or more communication protocols including General Packet Radio Service (GPRS), 1Xrtt, and Short Message Service, which are wireless services used to provide cellular access to a network, as well as 802.11 and 802.11b (Wi-Fi) protocols, and Bluetooth protocol, which provide local wireless connections to networks.

Under other embodiments, applications or systems are received on a removable Secure Digital (SD) card that is connected to a SD card interface 515. SD card interface 515 and communication links 513 communicate with a processor 517 along a bus 519 that is also connected to memory 521 and input/output (I/O) components 523, as well as clock 525 and location system 527.

I/O components 523, in one embodiment, are provided to facilitate input and output operations. I/O components 523 for various embodiments of the device can include input components such as buttons, touch sensors, touch screens, proximity sensors, microphones, tilt sensors, and gravity switches and output components such as display device 526, a speaker, and or a printer port. Other I/O components 523 can be used as well.

Clock 525 illustratively comprises a real time clock component that outputs a time and date. It can also, illustratively, provide timing functions for processor 517.

Location system 527 illustratively includes a component that outputs a current geographical location of device 518. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 521 stores operating system 529, network settings 531, applications 533, application configuration settings 535, registry 537, communication drivers 539, and communication configuration settings 541. Memory 521 can include all types of tangible volatile and non-volatile computer-readable memory devices. Memory 521 stores computer readable instructions that, when executed by processor 517, cause the processor to perform computer-implemented steps or functions according to the instructions. Processor 517 can be activated by other components to facilitate their functionality as well.

Examples of the network settings 531 include things such as proxy information, Internet connection information, and mappings. Application configuration settings 535 include settings that tailor the application for a specific enterprise or user. Communication configuration settings 541 provide parameters for communicating with other computers and include items such as GPRS parameters, SMS parameters, connection user names and passwords.

Applications 533 can be applications that have previously been stored on the device 518 or applications that are installed during use. In one embodiment, applications 533 can be part of operating system 529, or hosted external to device 518, as well.

Figure 8:
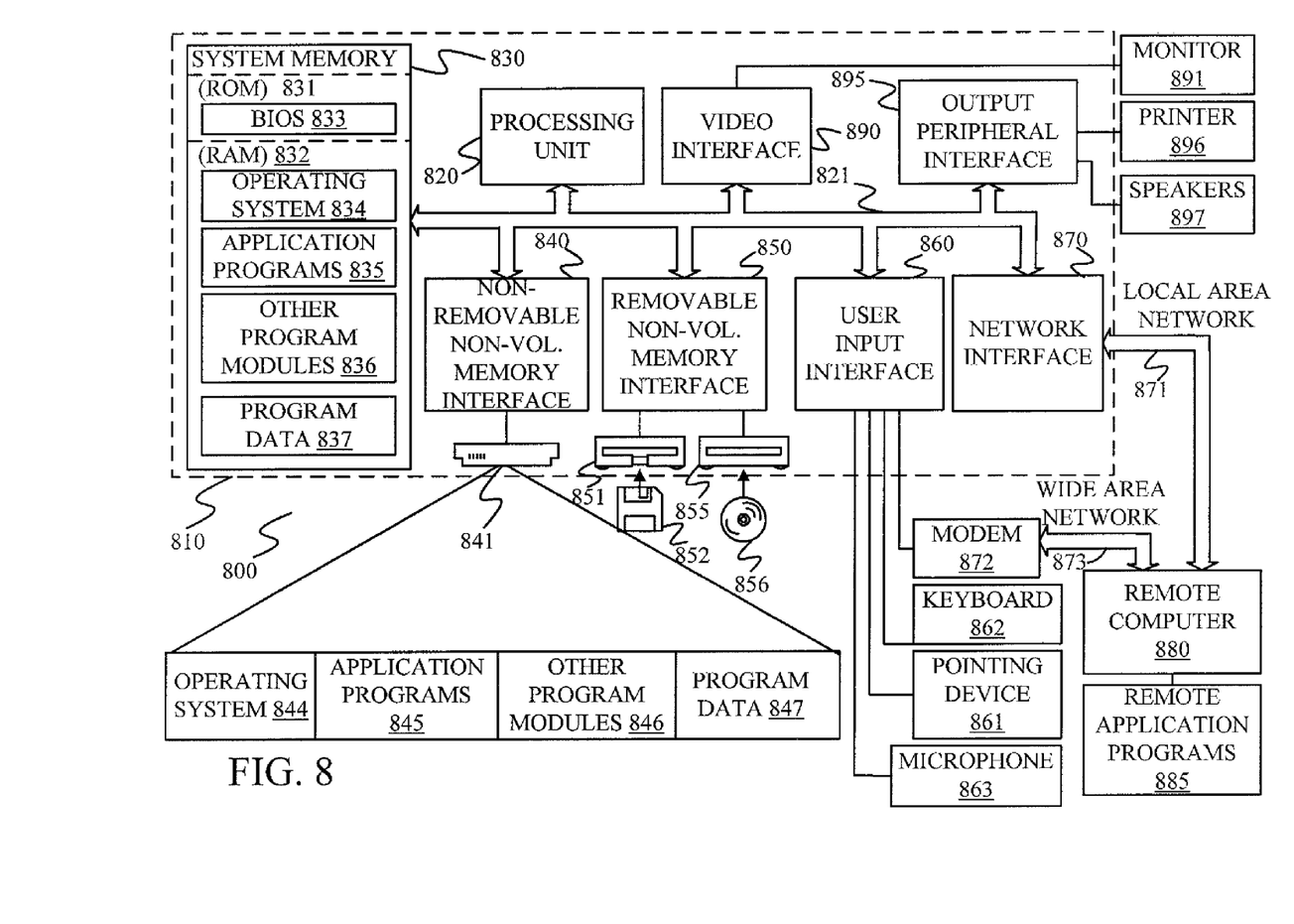
FIG. 8 is a schematic diagram of a computer or a computing device.

FIGS. 8 and 9 provide examples of devices 518 that can be used, although others can be used as well. In FIG. 8, a smart phone or mobile phone 545 is provided as the device 518. Phone 545 includes a set of keypads 547 for dialing phone numbers, a display 549 capable of displaying images including application images, icons, web pages, photographs, and video, and control buttons 551 for selecting items shown on the display. The phone includes an antenna 553 for receiving cellular phone signals such as General Packet Radio Service (GPRS) and 1Xrtt, and Short Message Service (SMS) signals. In some embodiments, phone 545 also includes a Secure Digital (SD) card slot 555 that accepts a SD card 557.

The mobile device of FIG. 9 is a personal digital assistant (PDA) 559 or a multimedia player or a slate or tablet computing device, etc. (hereinafter referred to as PDA 559). PDA 559 includes an inductive screen 561 that senses the position of a stylus 563 (or other pointers, such as a user's finger) when the stylus is positioned over the screen. This allows the user to select, highlight, and move items on the screen as well as draw and write. PDA 559 also includes a number of user input keys or buttons (such as button 565) which allow the user to scroll through menu options or other display options which are displayed on display 561, and allow the user to change applications or select user input functions, without contacting display 561. Although not shown, PDA 559 can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections. In one embodiment, mobile device 559 also includes a SD card slot 567 that accepts a SD card 569.

Note that other forms of the devices 518 are possible. Examples include tablet or slate computing devices, music or video players, and other handheld computing devices.

FIG. 10 is one embodiment of another computing environment. With reference to FIG. 10, an exemplary system for implementing some embodiments includes a general-purpose computing device in the form of a computer 810. Components of computer 810 may include, but are not limited to, a processing unit 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 10 illustrates operating system 834, application programs 835, other program modules 836, and program data 837.

The computer 810 may also include other removable/non-removable volatile/nonvolatile computer storage media. By way of example only, FIG. 10 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media discussed above and illustrated in FIG. 10, provide storage of computer readable instructions, data structures, program modules and other data for the computer 810. In FIG. 15, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies. They can also include search components 802 and 804.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A monitor 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 15 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 10 illustrates remote application programs 885 as residing on remote computer 880. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method of selectively synchronizing different notebook components within a note-taking application with a database accessible remotely over a computer network, the method comprising:
identifying a first record of use for a first notebook component having first user content, wherein the first record of use indicates a prior user action on the first user content;
assigning a first synchronization rate to the first notebook component based on the first record of use;
identifying a second record of use for a second notebook component having second user content, that is different than the first user content, wherein the second record of use indicates a prior user action on the second user content;
assigning a second synchronization rate to the second notebook component based on the second record of use, the second synchronization rate being different than the first synchronization rate, wherein said first synchronization rate and said second synchronization rate correspond respectively to the first notebook component and the second notebook component such that said first notebook component and said second notebook component are within the same said note-taking application;
synchronizing the first notebook component with the database based on the first synchronization rate; and
synchronizing the second notebook component with the database based on the second synchronization rate.

2. The method of claim 1, wherein identifying the first and second record of use comprises:
for each of the first and second notebook components, determining an amount of time since a user has last accessed the notebook component.

3. The method of claim 1, wherein identifying the first and second record of use comprises:
for each of the first and second notebook components, determining when the user has last viewed the notebook component.

4. The method of claim 1, wherein the prior user action on the first user content comprises the user viewing the first notebook component, and the prior user action on the second user content comprises the user viewing the second notebook component.

5. The method of claim 1, wherein the first notebook component comprises a first notebook containing notebook pages, and wherein the second notebook component comprises a second notebook containing notebook pages.

6. The method of claim 1, wherein the first notebook component comprises a first notebook page within a notebook, and wherein the second notebook component comprises a second notebook page within the notebook.

7. The method of claim 1, wherein each of the assigned synchronization rates defines a frequency at which synchronization operations are to be carried out on the user content of the notebook component to which the synchronization rate is assigned.

8. A client computing device comprising:
at least one processor;
a network communication interface configured to communicate with a server computing system over a computer network; and
memory storing instructions executable by the at least one processor, wherein the instructions configure the client computing device to:
execute a note-taking application on the client computing device, the note-taking application including a first notebook component having first user content and a second notebook component having second user content that is different than the first user content;
identify a first record of use for the first notebook component, wherein the first record of use indicates a prior user action performed on the first notebook component using the note-taking application on the client computing device;
identify a second record of use for the second notebook component, wherein the second record of use indicates a prior user action performed on the second notebook component using the note-taking application on the client computing device;
determine that the first notebook component is due for synchronization with the server computing system based on the first record of use;
perform a first synchronization operation, based on the determination that the first notebook component is due for synchronization, to synchronize the first notebook component with the server computing system over the computer network;
determine that the second notebook component is due for synchronization with the server computing system based on the second record of use; and
perform a second synchronization operation, based on the determination that the second notebook component is due for synchronization, to synchronize the second notebook component with the server computing system over the computer network.

9. The client computing device of claim 8, wherein the instructions configure the client computing device to:
determine that the first notebook component is due for synchronization with the server computing system by assigning a first synchronization rate to the first notebook component based on the first record of use;
determine that the second notebook component is due for synchronization with the server computing system by assigning a second synchronization rate to the second notebook component based on the second record of use, the second synchronization rate being different than the first synchronization rate, wherein said first synchronization rate and said second synchronization rate and independent from one another and correspond, respectively, to the first notebook component and the second notebook component such that said first notebook component and said second notebook component are within the same said note-taking application;
perform the first synchronization operation in accordance with the first synchronization rate; and
perform the second synchronization operation in accordance with the second synchronization rate.

10. The client computing device of claim 9, wherein the instructions configure the client computing device to:
determine a first synchronization category associated with the first notebook component based on the first record of use;
determine the first synchronization rate based on the first synchronization category;
determine a second synchronization category associated with the second notebook component based on the second record of use; and determine the second synchronization rate based on the second synchronization category.

11. The client computing device of claim 9, wherein the instructions configure the client computing device to:
assign the fit synchronization rate to the first notebook component based at least in part on an indication when the first notebook component was last accessed by a user of the note-taking application on the client computing device; and
assign the second synchronization rate to the second notebook component based at least in part on an indication when the second notebook component was last accessed by the user of the note-taking application on the client computing device.

12. The client computing device of claim 9, wherein the instructions configure the client computing device to:
assign the first synchronization rate to the first notebook component based at least in part on an indicator of how likely the user content of the first notebook component is to be of interest of a user of the note-taking application on the client computing device; and
assign the second synchronization rate to the second notebook component based at least in part on an indicator of how likely the user content of the second notebook component is to be of interest of a user of the note-taking application on the client computing device.

13. The client computing device of claim 9, wherein the first notebook component comprises a first notebook containing a first notebook page and the second notebook component comprises a second notebook containing a second notebook page, and wherein the instructions configure the client computing device to:
assign the first synchronization rate to the first notebook based at least in part on a determination as to when the first notebook page was last accessed by a user of the note-taking application on the client computing device; and
assign the second synchronization rate to the second notebook based at least in part on a determination as to when the second notebook page was last accessed by the user of the note-taking application on the client computing device.

14. The client computing device of claim 8, wherein each of the notebook components comprise a collection of notebook pages.

15. A computer-implemented method of selectively synchronizing different notebook components within a note-taking application with a database accessible remotely over a computer network, the method comprising:
identifying a first user usage characteristic indicative of a prior user action on a first notebook component;
based on the first user usage characteristic, selecting a first synchronization category from a plurality of synchronization categories, wherein each of the plurality of synchronization categories corresponds to a different synchronization rate;
assigning a first synchronization rate, associated with the first synchronization category, to the first notebook component;
identifying a second user usage characteristic indicative of a prior user action on a second notebook component;
based on the second user usage characteristic, selecting a second synchronization category from the plurality of synchronization categories;
assigning a second synchronization rate, associated with the second synchronization category, to the second notebook component, wherein the first synchronization rate and the second synchronization rate correspond respectively to the first notebook component and the second notebook component such that said first notebook component and said second notebook component are within the same said note-taking application;
identifying, based on the assigned first synchronization rate, a first synchronization operation to be performed on the first notebook component to synchronize the first notebook component with the database;
identifying, based on the assigned second synchronization rate, a second synchronization operation to be performed on the second notebook component to synchronize the second notebook component with the database; and
performing the first and second synchronization operation.

16. The method of claim 15, wherein the prior user action comprises a last access instance indicative of a user of the note-taking application accessing at least one or more of the first notebook component and the second notebook component.

17. The method of claim 15, further comprising postponing performing the synchronization in response to receiving an indication of a change in a status of a network configuration.

18. The method of claim 15, wherein the first notebook component is a collection of first notebook pages and the second notebook component is a collection of second notebook pages.

19. The method of claim 15, wherein the plurality of synchronization categories comprise:
a low interest category;
a moderate interest category; and
a regular interest category.

* * * * *